Figure 3:
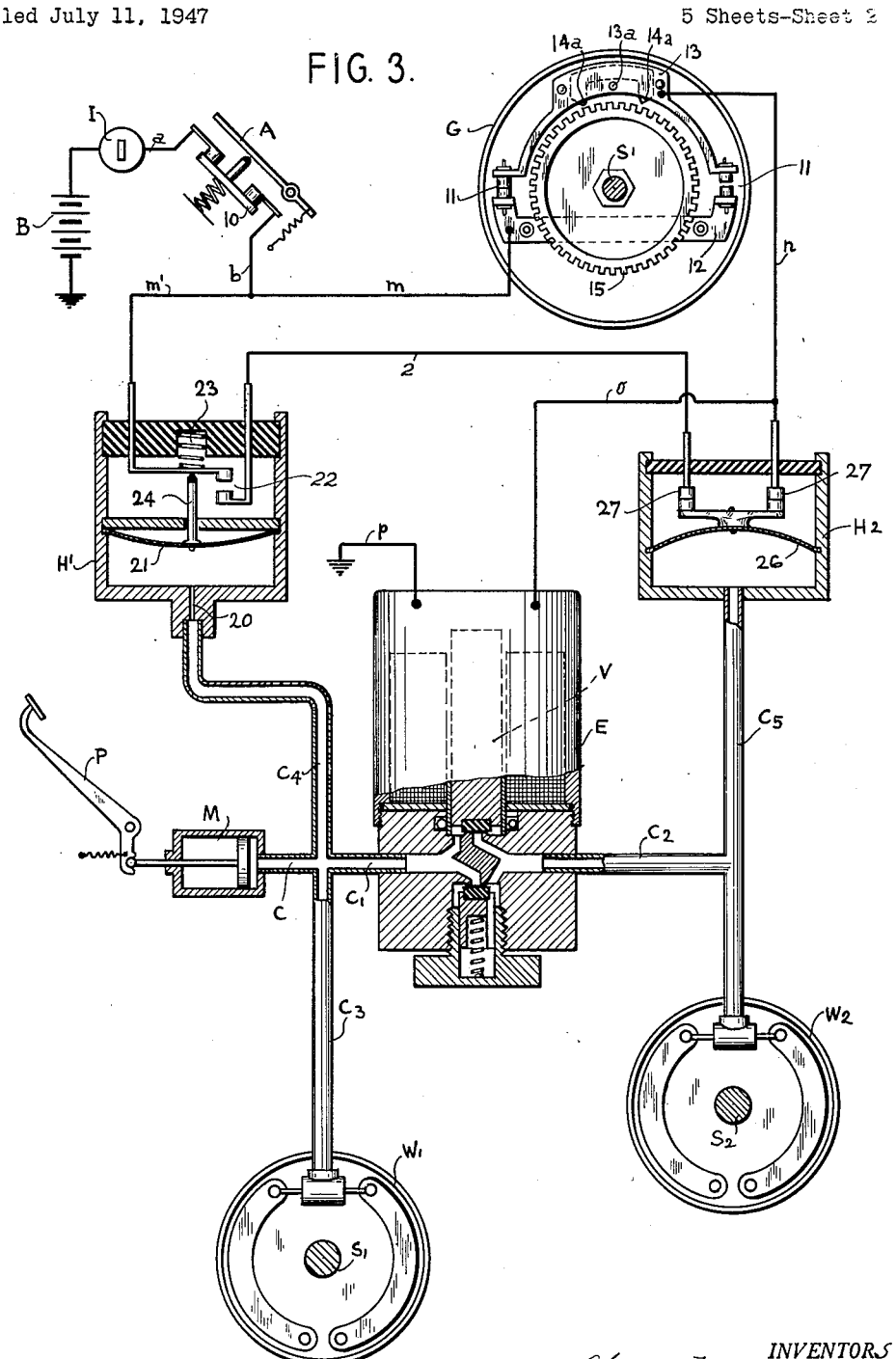

March 3, 1953 A. WEISS ET AL 2,630,196
MEANS FOR CONTROLLING THE BRAKES OF MOTOR VEHICLES
Filed July 11, 1947 5 Sheets-Sheet 1
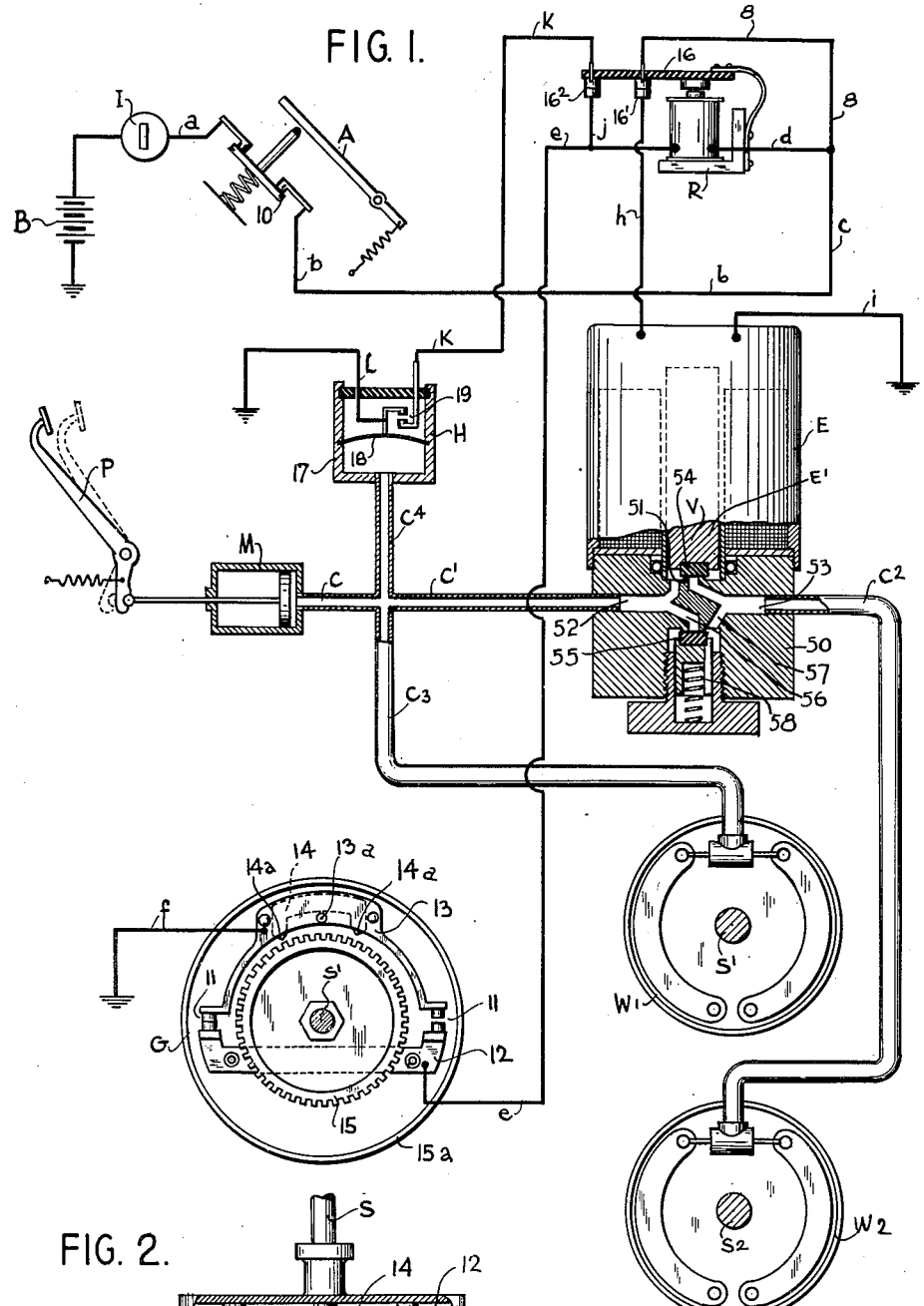
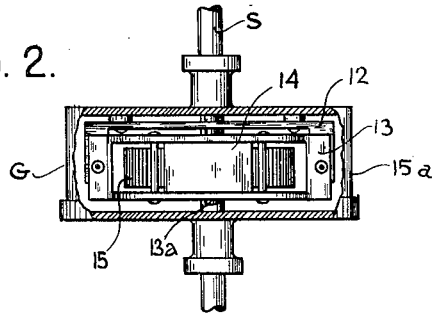
INVENTORS
Abraham Weiss and Joseph Weiss
BY
ATTORNEY March 3, 1953 A. WEISS ET AL 2,630,196
MEANS FOR CONTROLLING THE BRAKES OF MOTOR VEHICLES
Filed July 11, 1947 5 Sheets-Sheet 3

INVENTORS
Abraham Weiss and Joseph Weiss
BY
ATTORNEY.

March 3, 1953  A. WEISS ET AL  2,630,196
MEANS FOR CONTROLLING THE BRAKES OF MOTOR VEHICLES
Filed July 11, 1947  5 Sheets-Sheet 4

INVENTORS
Abraham Weiss and Joseph Weiss
BY
ATTORNEY.

Patented Mar. 3, 1953

2,630,196

UNITED STATES PATENT OFFICE 2,630,196

MEANS FOR CONTROLLING THE BRAKES OF MOTOR VEHICLES

Abraham Weiss and Joseph Weiss, New York, N. Y.; said Joseph Weiss, administrator of said Abraham Weiss, deceased, assignor to Joseph Weiss individually Application July 11, 1947, Serial No. 762,590

16 Claims. (Cl. 192—3)

This application is a continuation-in-part of our application Serial #715,580, filed December 14, 1946, and the invention pertains to motor vehicles and more specifically to means for controlling the brakes thereof.

The main object of this invention is to provide means whereby the brakes of the vehicle wheels will be effectively and automatically locked in braking position when, on the depression of the brake pedal, the vehicle is at rest, while the ignition is on and the accelerator pedal released, and on release of said brake pedal, will be automatically unlocked by the depression of the accelerator pedal.

Still another object is to provide electrically controlled means for actuating fluid pressure brakes, with a governor impelled from a driven part not affected by said electric means, so that when said governor is in motion, the circuit of said electric means will be broken releasing said brakes, and when at rest, said circuit will be closed to retain said brakes in locked position.

Another object of this invention is to provide means whereby when the motor stalls, while the ignition is on and the brakes are locked, the motor can be restarted without causing the unlocking of the brakes.

Still another object of this invention is to provide means which will prevent the accidental unlocking of the brakes when the vehicle through some cause is moved from its rest position.

Other objects will appear from the detailed description of our invention.

Figure 4:
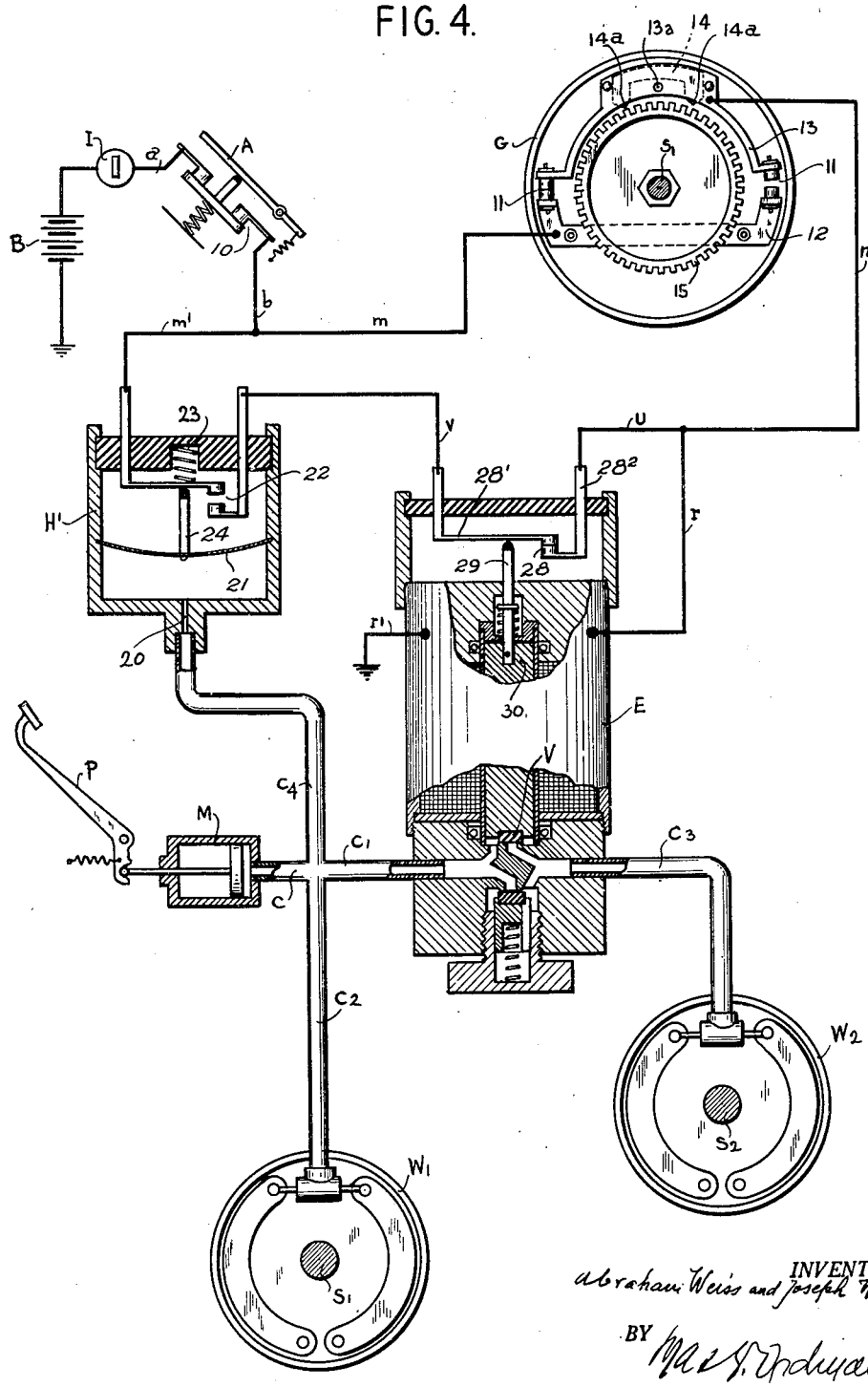
Figure 5:
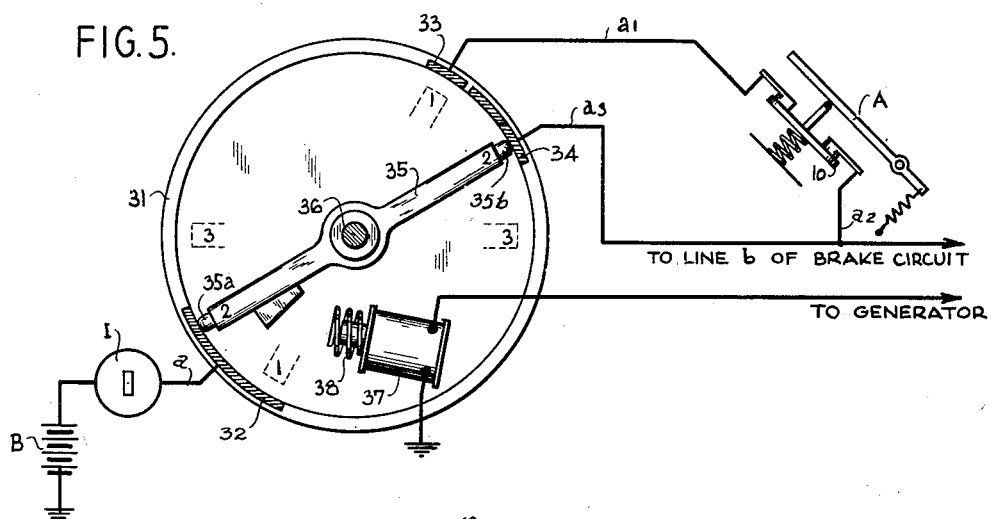
Figure 6:
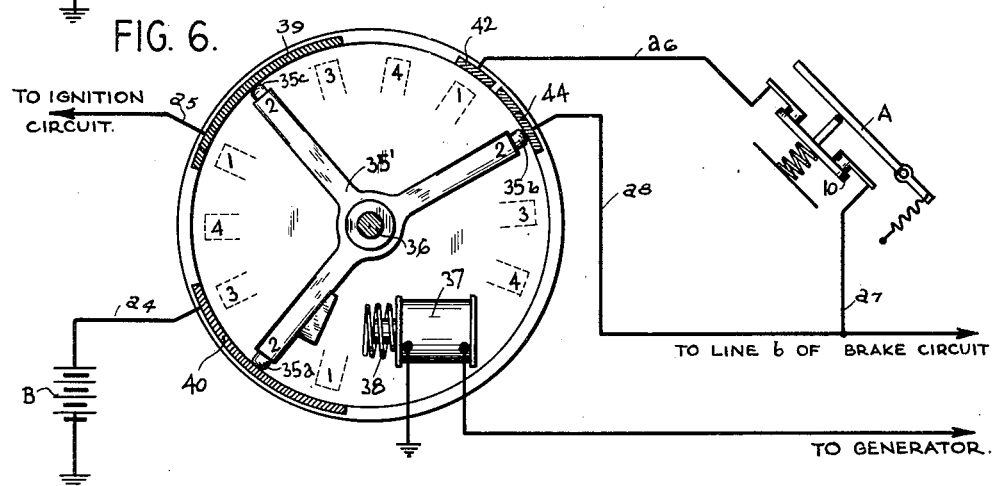
Figure 7:
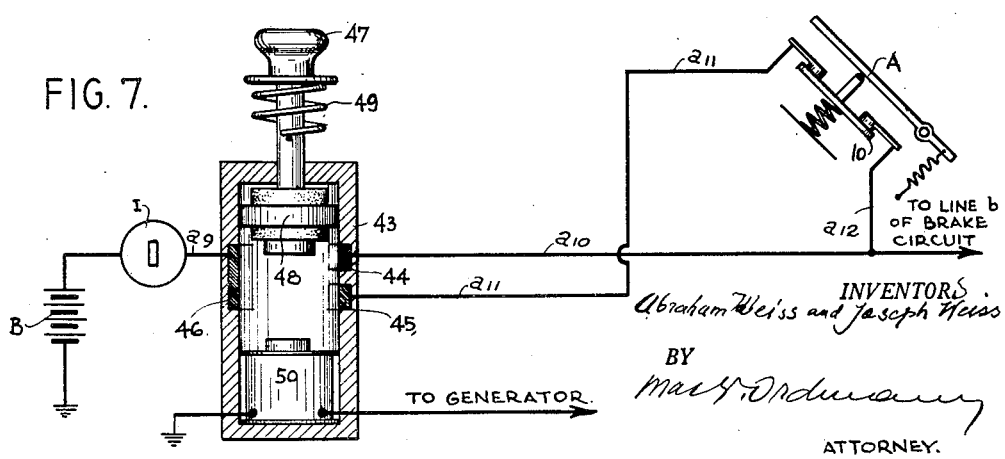
Figure 8:
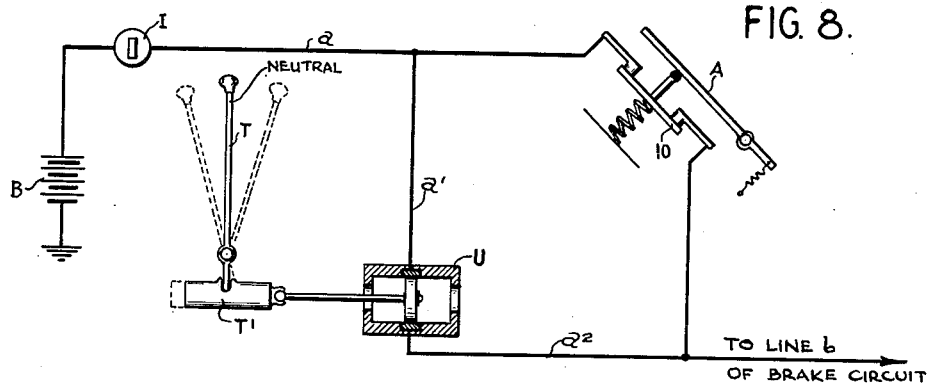
Figure 9:
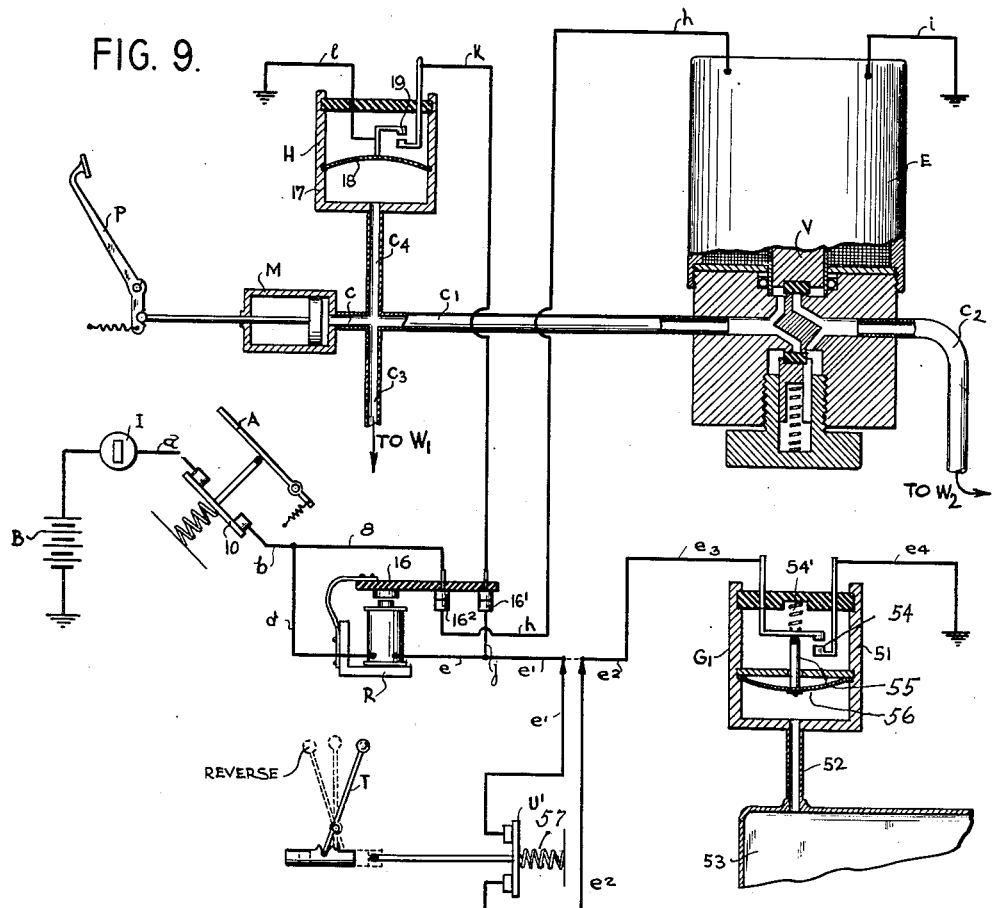

In the accompanying drawings constituting part of the specification, and in which similar reference characters denote corresponding parts:

Fig. 1 is a diagrammatic view of one embodiment of our invention;

Fig. 2 is a top plan view of the governor controlling the electric circuit, the upper part of said governor being broken away, to show details of construction, Figs. 3 and 4 are diagrammatic views of modified forms of construction of our invention, Figs. 5, 6 and 7 show different forms of manual control of the electric circuits used, Figs. 8 and 9 are diagrammatic views of other modifications.

Referring first to the embodiment shown in Fig. 1, $W^1$, $W^2$ each denote the vehicle's fluid pressure actuated rear and front wheels respectively (only one of each being shown); $S^1$, $S^2$ the axles thereof, P the brake pedal, and A the accelerator pedal. M denotes the fluid pressure master cylinder and V a valve adapted to be actuated by solenoid E, and mounted between said master cylinder M and the brakes of the wheels $W^2$, said valve serving to control the fluid pressure actuating the brakes of the wheels $W^2$ only, in the manner hereinafter described. The brake pedal P is operatively connected to the plunger working in the master cylinder M. Leading from said master cylinder M is a branched conduit C, one branch $C^1$ of which leads to the passages controlled by the electrically actuated valve V, another branch $C^2$ leads from said passages to the brakes of the wheels $W^2$, a third branch $C^3$ leads to the brakes of wheels $W^1$, and a fourth branch $C^4$ to a fluid pressure actuated mechanism H. When the solenoid E is energized, the valve V is adapted to trap the fluid pressure in the fluid cylinders of the brakes of the wheels $W^2$ and lock said brakes in braking position.

The valve V comprises a channelled body 50 formed with a valve seat 51. 52 denotes the inlet passage provided at one side of the seat 51, into which terminates branch pipe $C^1$ leading from the master cylinder M. 53 denotes the outlet passage on the opposite side of said seat leading through pipe section $C^2$ to the fluid cylinders of the brakes. The valve body proper, 54, is permanently attached to the armature $E^1$ of the solenoid E.

Provided in the channelled body 50 is also a spring actuated valve 55 controlling the auxiliary passages 56, communicating with the passages 52, 53 respectively. Passage 56 as at 58, communicates with the space behind the valve 55, whereby pressure fluid will be allowed to pass from the inlet into the outlet passage but not in the reverse direction.

The electric means for actuating the valve V include a switch 10 adapted to be closed when the accelerator A is released, as shown, and to open by the depression of said accelerator, the mechanism H adapted to be actuated by fluid pressure and a relay R adapted to be operated by a governor G.

The mechanism H comprises a housing 17 in which are mounted a movable member, such as a diaphragm 18, carrying a contact member connected by a line L to the ground, and a fixed contact connected by line k to a switch actuated by relay R.

The armature of the relay R actuates a resiliently supported insulated switch arm 16 controlling two switches $16^1$, $16^2$, which when the solenoid of said relay is energized, will close but normally be open.

The governor comprises a rotary member 15 of iron or the like, formed circumferentially with closely and equally spaced projections, teeth, serrations or the like, and adapted to be impelled from a driven part such as a wheel of a vehicle which can be either a front or a rear wheel with or without brake and which will not be affected by said electric means, as e. g. associated with the wheels $W^1$. Said rotary member is adapted to actuate a switch 11 by the following means: Fixed inside the housing $15^a$ of said rotary member is a contact plate 12 and pivotally supported at $13^a$ therein vertically above and in alignment with the axis of said rotary member 15 is a yoke-shaped contact arm 13 formed centrally with a magnet 14 having tooth-like projections $14^a$ at its ends. When said member 15 is at rest, one of the projecting ends $14^a$ of the magnet 14 according to which one is nearest to a tooth of said member 15 will be attracted and cause the switch 11 at one or the other end of the arm 13 and plate 12 to close. When said member is rotating the magnetic arm 14 will be caused to swing or vibrate vertically on its pivot and thereby alternately open and close said switch 11.

It will be clear that at some range of speed of the member 15 of the governor G, the alternate opening and closing of the switch 11 will prevent the relay R from receiving the full value of the current due to the resistance set up between the contact points of switch 11. At greater speeds of member 15 the swinging arm 14 will remain in neutral position, due to the rapid changes of direction, thus retaining switch 11 open and therefore the relay R deenergized.

The mode of operation is as follows: Assuming the brake pedal P has been depressed, as indicated, the accelerator released and the ignition I is on. As soon as the vehicle comes to a full stop, one or the other pair of contacts of switch 11 of the governor, as previously explained, will be closed. By the depression of the brake pedal fluid pressure fluid in conduits $C^1$, $C^2$, $C^3$ and $C^4$, has caused the brakes of both wheels to be applied and at the same time switch 19 to be opened. As a result, therefore, the battery circuit will be closed, through line $a$, accelerator switch 10, lines $b$, $c$, $d$, through the windings of the relay R, line $e$, the closed governor switch 11 and line $f$, to the ground. This closed circuit will energize the solenoid of relay R closing switches $16^1$, $16^2$ thereof, so that a second branch of the same circuit will be closed through line $g$, switch $16^1$, line $h$, windings of solenoid E and line $i$ to the ground. The energized solenoid E will actuate valve V trapping fluid pressure on brakes of wheels $W^2$ and locking said brakes in braking position. On releasing the brake pedal P, and opening switch 10 by depressing the accelerator A, the circuit actuating the solenoid E is broken, and the brakes of wheels $W^2$ are unlocked.

If when the vehicle, with locked brakes, is skidding over icy or muddy roads with the governor not operating, the unlocking of the brake by depressing the accelerator and thereby opening switch 10 would be dangerous. However, by easing pressure on the brake pedal, not enough to permit switch 19 to close, but sufficiently to reduce pressure on the brakes of the wheels $W^1$ the governor deriving motion from said wheels, will again become operative. This will have the the effect to open the circuit through the valve actuating solenoid E unlocking the brakes of wheels $W^2$. In the event the vehicle is accidentally moved from its rest position, while the pedal P is released, the brakes of wheel $W^2$ will remain locked, because on the release of pedal P the switch 19 was closed, so that one branch of the circuit will be closed along through the relay R, along lines $a$, $b$, $c$, $d$, relay R, line $j$, switch $16^2$, line $k$, switch 19, line L to the ground, and another branch along line $g$, switch $16^1$, to solenoid E and thence line $i$ to the ground.

In the modification shown in Fig. 3, relay R of Fig. 1 is replaced by a fluid pressure mechanism $H^2$. The fluid pressure mechanism $H^1$, replacing H of Fig. 1, is preferably so constructed as to produce a delay action switch 22 in closing and permit a quick action in opening the same. To this end, the branch conduit $C^4$ leading from the master cylinder M terminates into a relatively narrow passage 20 of the chamber of mechanism $H^1$. The movable contact piece of said switch 22 is under action of a spring 23 and adapted to be raised from the stationary contact by a member 24 projecting from a diaphragm 21 in said housing.

The mechanism $H^2$ comprises a fluid pressure chamber which communicates through a branch $C^5$ with conduit $C^2$, leading to brakes of wheels $W^2$. The fluid pressure actuated diaphragm 26 carries a contact plate having a pair of contact points adapted in cooperation with a pair of stationary contact points to act as switch 27. When the brake pedal is depressed the fluid pressure through branch $C^5$ will cause the said pairs of switches to close. The stationary contacts of one of said switches is electrically connected to the swinging contact arm 13 of the governor G, while the stationary contact of the other switch 27 is electrically connected to the stationary contact of switch 22. The movable contact of said switch 22 is electrically connected to the stationary contact arm 12 of governor G and also to one of the contacts of switch 10.

The operation is as follows:

When the vehicle is running with brake pedal released and accelerator switch 10 open, the circuit through solenoid actuated valve V is broken and the brakes are unlocked.

On depressing the brake pedal P fluid pressure will apply brakes of both sets of wheels $W^1$, $W^2$. At the same time, the fluid pressure through conduit $C^5$ will cause switches 27 to close. As a result thereof, the battery circuit through the solenoid E of valve V will close as soon as the vehicle and consequently the governor G come to a full stop, the battery circuit being closed through accelerator switch 10, line $b$, governor actuated switch 11, lines $n$, $o$, to solenoid E and thence through line $p$ to the ground.

On the release of the brake pedal, while there is still fluid pressure in the branch $C^5$ the switch 27 remains closed, so that the circuit through the solenoid E remains closed.

In the event of skidding over icy or muddy roads, with the brakes of wheel $W^2$ locked, and governor not working, on a partial release of the brake pedal without causing the closing of switch 22 but enough to release brakes of wheels $W^1$, the governor will be set into operation again, as a result of which the brakes of wheels $W^2$ will be unlocked, as heretofore explained.

In the modification shown in Fig. 4, the switch 27 of Fig. 3 is replaced by a switch 28 adapted to be actuated by the armature of the solenoid E.

The switch 28 comprises a movable contact member $28^1$ and a stationary contact member $28^2$. The former is operable by a rod 29 fixed to and projecting from the armature 30 of the solenoid E. The movable contact member $28^1$ is connected by wire $v$ to the stationary contact member of the fluid pressure actuated switch $H^1$, and the stationary contact member $28^2$ is connected by wires $u$, $r$, to the coil of the solenoid and by wires $u$, $n$, to governor switch 11.

This switch 22 is open when there is fluid pressure in the conduit $C^4$ and the switch 28 is closed when the solenoid E is energized.

The operation is as follows:

When brake pedal P is depressed fluid pressure in conduit $C^4$ will open switch 22. As soon as vehicle and governor come to full stop, governor switch 11 is closed, so that the electric circuit will be closed through line $a$, switch 10, lines $b$ and $m$, governor switch 11, lines $n$, $r$, to solenoid E and thence through $r^1$ to the ground, energizing solenoid E. The attracted armature 30 of the latter through rod 29 will permit switch 28 to close.

Upon the release of brake pedal, switch 22 under action of spring 23, will rapidly close, so that if the governor for some cause started to operate, the circuit will remain closed, through lines $b$, $m^1$, closed switch 22, line $v$ armature actuated switch 28, lines $u$, $r$, and solenoid E to ground.

To enable the restarting of the motor, in the event it stalls while the brakes are locked, we provide manual switch mechanism shown in Figs. 5, 6, and 7.

In the construction shown in Fig. 5, this mechanism comprises a circular stationary contact member 31, having three circumferentially arranged contact shoes 32, 33, 34, and a rotatable double-armed contact arm 35 mounted on a central axis 36 and having at its diametrically opposed ends contact points $35^a$, $35^b$, adapted in cooperation with the said stationary contact shoes, in position "1," to close the battery circuit through the accelerator switch 10 along line $a$, contact arm 35, contact shoe 33, lines $a^1$, switch 10 and line $a^2$ to line $b$ of the heretofore described brake circuits.

When turned to position "2" the switch 10 will be by-passed and the circuit closed through line $a^3$, to line $b$ as before.

In position "3," the circuit will be broken.

The arm 35 may be held in position "1" by a generator actuated electro-magnet 37, or any other suitable means. When the motor stalls and the generator ceases to operate the arm 35 will be automatically thrust, as by spring 38 or otherwise, into the position "2."

In Fig. 6, there is an additional contact shoe 39 which is conductively connected to the ignition switch by wire $a^5$ and the rotatable contact member is in form of a three armed lever $35^1$. The contact shoes 39, 40, 41 and 42, are so spaced and admeasured that in position "1," the battery circuit and ignition will be completed through line $a^4$, $a^5$, contact lever $35^1$, line $a^6$, switch 10, line $a^7$ to line $b$ as before.

In position "2" the battery and ignition circuit will be completed through line $a^8$, by-passing the accelerator switch 10. In position "3" the brake actuating circuit will be broken. Position 4 is the "off" position.

In Fig. 7, a push member 47 carries a contact piece 48 which like a plunger works in a housing 43, and is adapted when pushed inwardly to cooperate with stationary contacts 44, 45, and 46, provided in said housing, so as to in one position close the battery circuit, through the accelerator switch 10 along lines $a^9$, $a^{11}$ and $a^{12}$ to line $b$, as before, and in another position, close the circuit by-passing the switch 10 along line $a^9$ and $a^{10}$ to line $b$.

An electro-magnet 50 or the like may be provided to retain the push member 47 in the first mentioned position while the motor is operating and a spring 49 may tend to return said push member into by-pass position when released.

In the modification of Fig. 8, instead of the manually actuated switch shown in either of Figs. 5, 6 or 7, the circuit actuating the solenoid E of valve V may be controlled by a switch to be actuated from the transmission. Here T denotes the shift lever of the transmission whose member $T^1$ is adapted to actuate an electric switch U. This switch when the transmission is in neutral, as in the position shown, is adapted to be closed, but will be opened when the rod T is shifted to a change gear speed position. The electric connections are from line $a$ of the battery circuit along line $a^1$ to one contact point of said switch and along line $a^2$ from the other contact point thereof to line $b$ of the brake controlling circuit, shown in Figs. 1, 3 or 4, thus by-passing the accelerator switch 10. By means of this additional switch it is thus possible to accelerate the motor while the vehicle is at rest and the brakes are locked, without releasing the brakes until the operator is ready to move the vehicle.

In the embodiment shown in Fig. 9, we substitute for the governor G shown in Figs. 1, 3 or 4, a governor $G^1$ to be actuated by hydraulic pressure generated in the transmission by a fluid pump, when the vehicle is moving. We also employ a switch $U^1$, similar to one shown in Fig. 8, adapted to be actuated from the transmission.

The hydraulic governor $G^1$ comprises a chamber 51 which through a conduit 52 may communicate with the oil chamber 53 of the transmission. Mounted in chamber 51 is a switch 54, which when the vehicle is standing still is adapted to be closed by spring $54^1$ or other suitable means, and which, by the oil pressure in chamber 53 generated, while driving forwardly, will cause said switch to be opened by means of a member 55 projecting from a diaphragm 56 or other movable body within said chamber 51.

The transmission actuated switch $U^1$ is adapted to be automatically closed under spring pressure 57, when the shift rod T is in neutral or forward drive position, but to be opened when the transmission is in the reverse position.

The electric connections between the battery B, the transmission actuated switch $U^1$ and the governor actuated switch 54 are as follows: Line $b$ from the accelerator switch 10 leads through the coil of the relay R, line $e$ from the latter to line $j$ through switch $10^1$ and to line $e^1$ to switch $U^1$, line $e^2$ from the latter to line $e^3$ to switch 54 and through line $e^4$ to ground.

The operation is as follows: When the vehicle is moving forwardly with the accelerator A depressed, the solenoid circuit, as heretofore described, is broken and the brakes of the wheels $W^2$ released.

When the brake pedal P is depressed, the accelerator A released, closing switch 10, the transmission rod T put into neutral closing switch $U^1$ and the governor actuated switch 54 closed, the electric circuit through the solenoid E will be closed, locking the brakes of wheels $W^2$.

On a release of the brake pedal, the switch 19 will be closed, so that the solenoid actuating circuit will remain closed, as heretofore described, until after the depression of the accelerator.

When the transmission rod T is shifted into the reverse, the governor switch 54 will be cut out so that the governor circuit will be opened, permitting the vehicle to move in the reverse.

It is clear that when, instead of governor G shown for instance in Fig. 1, a hydraulic governor $G^1$ is employed, which as heretofore stated, acts by the pressure generated only when the vehicle is moving forwardly, the transmission switch $U^1$ must be used, since without it, the governor switch 54 would remain closed and therefore keep the solenoid circuit closed, when the vehicle is moving in reverse and the accelerator is released. The switch $U^1$ shown in Fig. 9 is necessary only when the governor, be it mechanical, hydraulic, etc., does not operate in reverse speed.

It is to be expressly understood that we do not wish to limit ourselves to the details of the construction described and shown, since the same may be modified in various ways without departing from the principle of our invention.

We we claim is:

1. In a motor vehicle having fluid pressure brakes, means for automatically controlling the fluid pressure of at least one of said brakes, a wheel in said vehicle not affected by said one of said brakes, and a governor impelled from said wheel, said governor being adapted while impelled by said wheel when the vehicle is in motion to automatically cause said means to keep said one of said brakes unlocked and when at rest to cause the locking of said one of said brakes.

2. In a motor vehicle having fluid pressure brakes, means for automatically controlling the fluid pressure of at least one of said brakes, said means including a valve, electric means for actuating said valve, a wheel in said vehicle not affected by said one of said brakes, and a governor impelled from said wheel, said governor being adapted to automatically control said electric means so as to cause the closing of said valve and thereby the locking of said one of said brakes, when the vehicle is at rest, and the unlocking of said one of said brakes when said wheel is revolving.

3. In a motor vehicle having fluid pressure brakes, a brake pedal, an accelerator, means for automatically controlling the fluid pressure of at least one of said brakes, said means including a valve, electric means for actuating said valve including a switch adapted to be operated by the depression of said accelerator, a wheel in said vehicle not affected by said one of said brakes, a governor impelled from said wheel, said governor being adapted to automatically control said electric means so as to cause the closing of said valve and thereby the locking of said one of said brakes, when the vehicle is at rest, and the unlocking of said one of said brakes when said wheel is revolving, and means for maintaining said one of said brakes locked on the release of said brake pedal, until after the depression of said accelerator.

4. In a motor vehicle having brakes and an accelerator, fluid pressure means for actuating said brakes including a brake pedal, a valve adapted to control the fluid pressure of at least one of said brakes, electric means for actuating said valve, said means including a circuit, a switch in said circuit adapted to be opened by action of the accelerator, a solenoid in said circuit adapted when energized by closure of said circuit to close said valve and thereby lock said one of said brakes in braking position, a wheel in said vehicle not affected by said one of said brakes, a governor operated from said wheel, said governor, when in motion, being adapted to break the circuit through said solenoid, and when at a standstill to close said circuit, and a fluid pressure actuated switch to maintain the circuit closed on the release of said brake pedal.

5. In a motor vehicle according to claim 1, in which said governor comprises a driven metal member, a stationary contact piece, and a movable contact piece, a magnet associated with said movable contact piece, and adapted by attraction to said member, when the latter is in motion, to open said contact pieces, and when at a standstill to close the same.

6. In a motor vehicle according to claim 1, in which said governor comprises a driven rotary metal gear, a stationary contact piece, a magnet actuated movable contact arm, adapted by the attraction of said gear when the latter is at rest, to hold said contact pieces in the circuit closing position and when said gear is rotated to open the same.

7. In a motor vehicle according to claim 1, in which said governor comprises a driven rotary metal member, having circumferentially closely and equally spaced projections, a stationary contact piece having a pair of contacts at the ends, magnetic contact arm pivotally supported centrally above said rotary member, and formed with a pair of contact points at its ends adapted to cooperate with the corresponding contact points of said stationary piece, said magnetic contact arm being adapted by attraction between it and the projections of said rotary member during its rotation at some range of speed to alternately close and open said contacts, and at another range of speed to cause said arm to retain its neutral position and thereby hold said contacts open, and when said member is at rest, to cause one or the other pair of contacts closed.

8. In a motor vehicle, according to claim 2, in which the electric means includes a fluid pressure actuated switch which is normally closed but adapted to be opened by the depression of the brake pedal.

9. In a motor vehicle according to claim 2, in which the electric means include a fluid pressure actuated switch having means for causing a retarded closing and means for causing a relatively rapid opening thereof.

10. In a motor vehicle according to claim 2, in which the electric means include two fluid pressure actuated switches, one of said switches being adapted to open and the other to close under fluid pressure.

11. In a motor vehicle according to claim 4, in which the electric means include a fluid pressure actuated switch and a switch actuated by the armature of said valve actuating solenoid, one of said switches being adapted to be opened under fluid pressure and the other to be closed when said solenoid is energized.

12. In a motor vehicle according to claim 3, in which the electric means include a manual switch comprising stationary contact pieces and a movable contact member, capable in one position to close the circuit direct through said accelerator switch, in another position to close said circuit by by-passing said accelerator switch and in a third position to open said circuit.

13. In a motor vehicle, according to claim 3, in which said electric means include a transmission means actuated switch adapted when the transmission means is in neutral position to close the circuit to by-pass said accelerator actuated switch, and when said means are shifted to speed, either forward or in reverse, to open said switch.

14. In a motor vehicle having fluid pressure brakes, means for automatically controlling the fluid pressure of at least one of said brakes, said means including a valve, a wheel in said vehicle not affected by said one of said brakes, electric means including a hydraulic governor actuated switch operated from said wheel and adapted to be opened by fluid pressure generated during forward drive of the vehicle, and a transmission actuated switch adapted to be closed when the transmission is in neutral or in forward speed, but open when in reverse, said electric means being adapted to automatically actuate said valve so as to close it and thereby lock said one of said brakes, when the vehicle is at rest and to open said valve and unlock said one of said brakes when the vehicle is driven forwardly or in the reverse.

15. In a motor vehicle having brakes, means for actuating said brakes, electric means for controlling a part of said actuating means, whereby less than all of said brakes are affected, a wheel in said vehicle not affected by said part of said actuating means, said electric means including an electric switch acting as a governor and adapted to be actuated by a pressure generating means impelled from said wheel, said governor adapted when actuated to render said second named means inoperative and when not actuated to render said second named means operative.

16. In a motor vehicle having fluid pressure brakes, means for actuating said brakes, means for controlling a part of said brake actuating means, whereby less than all of said brakes are affected, a wheel in said vehicle not affected by said part of said brake actuating means, and a governor impelled from said wheel, said governor adapted when actuated to cause said second named means to be inoperative, and operative when said governor is not actuated.

ABRAHAM WEISS.
JOSEPH WEISS.

REFERENCES CITED

The following references are of record in the file of this patent:

UNITED STATES PATENTS

| Number | Name | Date |
| --- | --- | --- |
| 1,205,054 | Stewart | Nov. 14, 1916 |
| 2,028,491 | Barrett | Jan. 21, 1936 |
| 2,113,915 | Freeman | Apr. 12, 1938 |
| 2,189,403 | Phillips | Feb. 6, 1940 |
| 2,217,141 | Sprenkle | Oct. 8, 1940 |
| 2,235,412 | Weiss | Mar. 18, 1941 |
| 2,251,787 | Gardiner | Aug. 5, 1941 |
| 2,262,842 | Goepfrich | Nov. 18, 1941 |
| 2,272,320 | Freeman | Feb. 10, 1942 |
| 2,287,562 | Pennington | June 23, 1942 |
| 2,297,692 | Chambers | Oct. 6, 1942 |
| 2,313,232 | Freeman | Mar. 9, 1942 |
| 2,313,430 | Goepfrich | Mar. 9, 1942 |
| 2,329,156 | Coffey | Sept. 7, 1942 |
| 2,334,611 | Darling | Nov. 16, 1943 |
| 2,345,280 | Morgan et al. | Mar. 28, 1944 |
| 2,411,632 | Moran | Nov. 26, 1946 |
| 2,414,409 | Goepfrich | Jan. 14, 1947 |
| 2,478,884 | Wiseler | Aug. 9, 1949 |